United States Patent [19]

Hengen

[11] 4,075,824
[45] Feb. 28, 1978

[54] HARVESTING MACHINE FEED MECHANISM

[75] Inventor: Edward John Hengen, Bettendorf, Iowa

[73] Assignee: Deere & Company, Moline, Ill.

[21] Appl. No.: 735,380

[22] Filed: Oct. 26, 1976

[51] Int. Cl.² ............................................. A01D 45/00
[52] U.S. Cl. ........................................ 56/14.6; 130/21; 130/27 AE
[58] Field of Search ................. 56/14.5, 14.6, 209; 130/21, 27 R, 27 AE

[56] References Cited

U.S. PATENT DOCUMENTS

| | | | |
|---|---|---|---|
| 2,855,142 | 10/1958 | White | 130/27 AE X |
| 3,092,116 | 6/1963 | Stroburg et al. | 130/27 R |
| 3,412,735 | 11/1968 | Bichel et al. | 130/21 |

FOREIGN PATENT DOCUMENTS

| | | | |
|---|---|---|---|
| 1,245,195 | 7/1967 | Germany | 130/21 |

Primary Examiner—Russell R. Kinsey

[57] ABSTRACT

A self-propelled combine has a mobile body with a forward inlet, a forward transversely elongated harvesting header, and a feeder housing extending between the header and the inlet for feeding crop material from the header to a crop treating mechanism in the combine body. The feeder housing has an upwardly and rearwardly inclined floor with a chain and slat type conveyor mounted in the housing and having a lower run moving upwardly and rearwardly above the floor. A flat pan-like crop deflecting member is mounted on top of the floor underneath the conveyor and includes a plurality of generally fore and aft vanes that extend a substantial portion of the length of the floor. The crop deflecting member is swingably mounted on a pivot extending through the floor, and a hydraulic cylinder is connected to the pivot on the underside of the floor to swing the deflector member between alternate positions wherein the vanes direct crop material moving along the floor toward one side of the body inlet or the other, whereby, when the combine is operating on a hillside, the crop material can be directed to the uphill side of the crop treating mechanism to reduce the buildup of material on the downhill side while the crop is being treated.

12 Claims, 2 Drawing Figures

HARVESTING MACHINE FEED MECHANISM

BACKGROUND OF THE INVENTION

This invention relates to an agricultural harvesting machine and more particularly to an improved feeding device for feeding crop material from the header to a crop treating mechanism in the harvester, such as a combine or the like.

There has been a long standing problem in operating harvesting machines such as combines in hilly terrain, since gravity tends to cause the crop material to shift towards the downhill side of the machine as the crop material moves through the crop treating mechanisms in the machine. The thickened mat of material on the downhill side of the machine, of course, tends to overload the threshing, separating, and cleaning mechanism on the downhill side, the cleaning mechanism being especially susceptible to overloading since it is the last to handle the crop material and the crop has a greater chance to accumulate on the downhill side. The severity of the problem is of course related to the severity of the slope on which the machine is operated. One solution of the problem has been to provide what is known as hillside combines, wherein the wheels on opposite sides of the combine raise and lower according to the slope of the hill so that the combine body is essentially self-leveling. This solution, however, requires complicated and expensive controls and mechanisms to accomplish the self-leveling function.

It is also known to provide fore and aft dividers in the combine separating and cleaning mechanisms to channelize the grain and prevent the shifting to the downhill side of the machine. While this is a partial solution, it does not solve uneven loading of the threshing cylinder. However, the applicants are aware of a combine design wherein doors are provided at the header outlet to close off the header outlet on the downhill side of the machine, so that the crop material leaving the header is chiefly on the uphill side of the machine. As the crop material moves rearwardly through the feeder housing to the threshing cylinder, gravity tends to cause the material to flow downhill so that it is spread somewhat evenly over the width of the cylinder. However, this solution is still somewhat expensive, and further it restricts the discharge capacity of the header since a portion of the outlet is blocked, which in some cases could reduce the harvesting capacity of the machine.

SUMMARY OF THE INVENTION

According to the present invention, there is provided an improved feed mechanism for feeding crop material from the header to the crop treating mechanism in a harvesting machine whereby crop material is directed toward the uphill side of the machine while it is being fed rearwardly.

An important feature of the invention resides in the simple, durable, and economical construction of the improved device, which can be added as an option or a simple attachment to machines already in the field.

More specifically, the improved feed system includes a deflecting member that is mounted on the feeder housing floor between the floor and the feeder housing conveyor, and includes vanes that channelize material moving along the floor, the deflector member being shiftable so that it directs the material moving along the floor toward the uphill side of the machine.

Another feature of the invention resides in the use of a simple device such as a hydraulic cylinder for controlling the position of the deflector member, the cylinder being selectively actuatable by the machine operator according to the slope on which the machine is operating or being capable of automatic actuation by an automatic control responsive to the slope of the field.

DESCRIPTION OF THE PREFERRED EMBODIMENT

Figure 1:
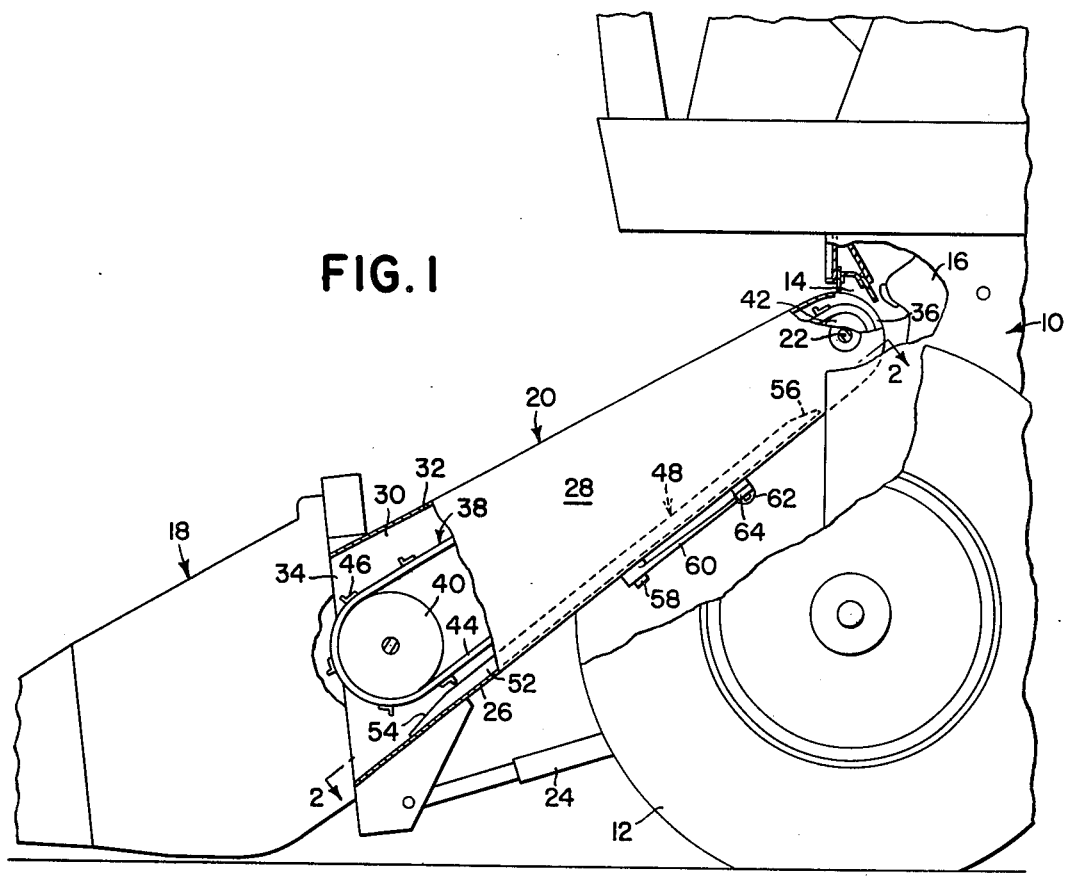
FIG. 1 is a somewhat schematic side elevation view of the forward end of the combine with portions broken away to show the improved feeding mechanism.

The improved feed mechanism is embodied in a self-propelled combine having a main separator body 10, only the forward portion of which is shown. The body is mounted on a pair of forward drive wheels 12 and steerable rear wheels (not shown) and has a forward crop inlet opening 14. Crop material moving through the inlet opening 14 is engaged by a threshing cylinder 16, which threshes the material and delivers it to crop separting and cleaning mechanisms mounted in the body. The combine has a transversely elongated header 18, which removes the crop from the field as the machine advances, converges the crop, and delivers it through a discharge opening in the rear of the header to a fore and aft feeder housing, indicated in its entirety by the numeral 20. The feeder housing is mounted on the combine body 10 by a transverse pivot 22 adjacent its rearward end, so that the feeder housing and the header 18 carried at the forward end thereof are vertically adjustable, a cylinder 24 being provided between the feeder housing and the body to control the position of the feeder housing and consequently the height of the header. All of the above represents more or less conventional combine construction and is not shown in detail.

The feeder housing 20 includes an upwardly and rearwardly inclined floor 26, opposite upright side walls 28 and 30 extending upwardly from the opposite sides of the floor, and an upwardly and rearwardly inclined top wall 32. The forward edges of the floor, the side walls and the top wall define the outline of a forward crop inlet 34 that registers with the header outlet, the header delivering crop material through the feeder housing inlet 34 as is well known. Similarly, the housing is open rearwardly to define an outlet 36 that also extends between the opposite side walls and communicates with the body inlet opening 14. As is apparent, the rearward end of the feeder housing extends into the inlet opening 14 so that the outlet 36 is immediately in front of the threshing cylinder 16.

A chain and slat type conveyor 38 is mounted in the housing and is also of conventional construction, the conveyor 38 including a transverse roller means 40 adjacent its forward end and a transverse rear roller means 42 coaxial with the pivot 22. The front and rear roller means are provided with sprockets and a plurality of chains 44 are trained around the sprockets, either two or three chains conventionally being provided and being transversely spaced, the chains and sprockets being schematically illustrated in the drawings. A plurality of transverse slats 46 extend between the adjacent chains at intervals along the chains, and, as is well known, the slats engage crop material moving through the inlet 34 and drag material upwardly and rearwardly along the feeder housing floor 26, the lower run of the conveyor moving rearwardly.

Mounted on the floor between the conveyor and the floor is a crop directing device, indicated in its entirety by the numeral 48. The crop directing device includes a flat pan-like member 50, immediately adjacent to the top of the floor, and a plurality of generally fore and aft parallel vanes 52 extending upwardly a short distance from the pan-like member 50. The vanes 52 are elongated in a fore and aft direction and have tapered front end 54 a short distance to the rear of the inlet 34 and similar tapered rear ends 56 forwardly adjacent to the outlet 36, so that the vanes extend well over half the length of the feeder housing floor. As is apparent, the vanes are relatively short in height, being approximately the same height as the height of the conveyor slates 46, which ride along the top of the vanes in the lower run of the conveyor, the tapered front and rear ends smoothing the transistion as the slats engage and disengage the top of the vanes. In the illustrated embodiment, four equally spaced vanes 52 are provided, to form three generally fore and aft channels between the vanes.

Figure 2:
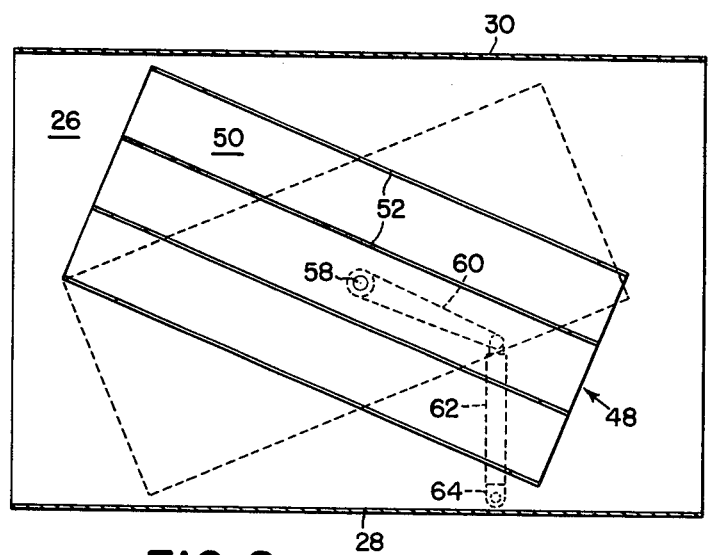
FIG. 2 is a plan view of the crop deflecting mechanism in the feeding mechanism as view along the lines 2—2 of FIG. 1, the deflector member being shown in one extreme position in full lines and in its alternate opposite extreme position in outline only and in dotted lines.

Connected to and extending downwardly from a central portion of the pan-like member 50 is a pivot 58, which extends through the floor 26 and has a radial arm 60 attached to its lower end. A hydraulic cylinder 62 has one end connected to the end of the arm 60 and the other end connected to the feeder housing 20 by means of a bracket 64, so that extension and retraction of the cylinder 62 rocks the pivot 58 and consequently the pan-like member 50, to swing a pan-like member between alternate positions wherein the vanes are inclined toward one side of the feeder housing or the other. As shown in FIG. 2, when the cylinder 62 is retracted, the pan-like member is swung so that its rearward edge is adjacent to the side wall 28, as shown in full lines, while when the cylinder 62 is extended, the rearward end of the pan-like member is adjacent the side wall 30.

In operation, when the combine is being operated on level ground the operator would normally extend the cylinder 62 about half-way, so that the vanes 52 extend substantially directly fore and aft. In crops including straw, such as wheat, most of the crop material being dragged along the floor rides under the conveyor slats and contacts the top of the vanes 52 so that the material would then be directed generally in a fore and aft direction to feed the cylinder 16 in a normal fore and aft fashion. In crops, such as corn, wherein only the ears are fed to the threshing cylinder, the ears would tend to move in the channels between the vanes as well as along the top of the vanes. If the combine were to be operated on a side hill, whereby the feeder housing side wall 28 would be on the uphill side, the hydraulic cylinder 62 would be retracted so that the crop directing device 48 would be positioned as shown in full lines in FIG. 2, so that the vanes 52 would direct the crop material to the uphill side of the threshing cylinder 16. Thus the material would start out on the uphill side while it is being treated, and would tend to disperse over the width of the combine separating and cleaning mechanisms as it travels through the combine. Conversely, if the combine were being operated on a hillside wherein the side wall 30 was on the uphill side, the cylinder 62 would be extended to position the crop directing device 48 in the dotted line position in FIG. 2, wherein the crop material is channeled toward the side wall 30 of the feeder housing to again feed the uphill side of the threshing cylinder. While it is contemplated that the cylinder 62 would be selectively controlled by the combine operator according to the direction of slope that the combine is being operated on, it can be appreciated that the cylinder could be controlled by a similar control system utilized on hillside combines to automatically control the extension of the cylinder and consequently the position of the crop directing device according to the hillside slope.

I claim:

1. In a harvesting machine having a mobile body with a crop inlet opening and a crop treating mechanism disposed in the body and a forward harvesting header adapted to remove crop material from the field as the machine advances, the combination therewith of an improved mechanism for feeding crop material from the header to the crop inlet opening comprising: a housing having a floor, opposite generally fore and aft sides extending upwardly from the floor, a forward inlet in crop receiving relationship with the header and a rearward outlet in crop transfer relationship with the body inlet opening; a conveyor means mounted in the housing above the floor and operative to move crop material rearwardly, along the floor from the housing inlet to the outlet; a crop directing means mounted in the housing between the conveyor means and the floor and including a plurality of generally upright vanes, the crop directing means being shiftable between alternate positions wherein the vanes are inclined toward one side of the housing or the other to respectively direct crop material being moved rearwardly through the housing by the conveyor means toward one side of the body crop inlet opening or the other; and control means for selectively controlling the position of the crop directing means.

2. The invention defined in claim 1 wherein the crop directing means is positionable between said alternate positions so that the vanes are substantially fore and aft to direct the crop material directly rearwardly through the body inlet opening.

3. The invention defined in claim 2 wherein the housing has generally fore and aft sides and the housing inlet and outlet extend between the opposite sides, the vanes being parallel to and spaced from said sides when they are in said fore and aft condition.

4. The invention defined in claim 3 wherein the crop directing means includes a pan-like member parallel to and adjacent the top of the floor, the vanes being connected to and extending upwardly from the pan-like member and being elongated in a fore and aft direction to extend at least half the fore and aft length of the housing.

5. The invention defined in claim 4 wherein the conveyor means includes a pair of axially transverse roller means respectively disposed adjacent the inlet and outlet, a plurality of transversely spaced endless flexible elements trained around the roller means, and a plurality of transverse slats connected to the flexible elements, the slats on the lower runs of the conveyor means moving rearwardly along the top of the vanes to drag crop material rearwardly along the floor and the pan-like member disposed thereon.

6. The invention defined in claim 5 wherein the crop directing means includes pivot means generally perpendicular to the floor and operatively connecting the pan-like member to the floor for swinging adjustment about the axis of the pivot means.

7. The invention defined in claim 5 wherein the control means includes a control member connected to the pan-like member and extending downwardly through the floor, and hydraulic cylinder means having one end connected to the control member to shift the pan-like member between its alternate positions in response to actuation of the cylinder.

8. The invention defined in claim 7 wherein the control member includes a pivot means swingably connecting the pan-like member to the floor.

9. In a combine having a mobile body with a forward crop inlet opening and a forward harvesting header adapted to remove crop material from the field as the machine advances, the combination therewith of an improved mechanism for feeding crop material from the header to the crop inlet opening comprising: a feeder housing extending between the header and the crop inlet opening and having an upwardly and rearwardly inclined floor, opposite generally fore and aft side walls extending upwardly from the floor, a forward inlet extending between the opposite side walls in crop receiving relationship with the header, and a rearward outlet extending between the side walls in crop transfer relationship with the body inlet opening; a conveyor means mounted in the housing above the floor and including front and rear roller means respectively adjacent the inlet and outlet, endless flexible elements trained around the front and rear roller means, and a plurality of transverse crop-engaging members carried by the endless flexible members, the crop engaging members in the lower run of the conveyor means moving upwardly and rearwardly above the floor; a crop directing means mounted in the housing between the conveyor means and the floor and including a flat pan-like member adjacent to the floor and having opposite side spaced from the opposite housing side walls, front and rearward ends adjacent the housing inlet and outlet respectively, and a plurality of longitudinal vanes extending upwardly from the pan-like member to form a plurality of shallow, generally fore and aft channels on top of the pan-like member, the transverse conveyor members riding along the top of the vanes in the lower run of the conveyor means; means mounting the crop deflecting means in the housing for swinging adjustment between a first position, wherein the vanes are generally fore and aft to direct crop material generally across the width of the outlet, or a second position wherein the vanes are inclined toward one side of the housing so that they direct crop material toward one side of the outlet; and control means operatively connected to the crop directing means for establishing the position of the crop directing means.

10. The invention defined in claim 9 wherein the crop directing means is shiftable to a third position wherein the vanes are inclined toward the other side of the housing to direct crop material toward the other side of the outlet.

11. In a harvesting machine having a mobile body with a crop inlet opening and a crop treating mechanism disposed in the body and a forward harvesting header adapted to remove crop material from the field as the machine advances, the combination therewith of an improved mechanism for feeding crop material from the header to the crop inlet opening comprising: a housing having a floor, opposite generally fore and aft sides extending upwardly from the floor, a forward inlet in crop receiving relationship with the header and a rearward outlet in crop transfer relationship with the body inlet opening; a conveyor means mounted in the housing above the floor and operative to move crop material rearwardly, along the floor from the housing inlet to the outlet; a crop directing means mounted in the housing between the conveyor means and the floor and including a plurality of generally upright vanes, inclined laterally from a fore and aft position the vanes operatively engaging crop material moving rearwardly along the floor to deflect the crop material laterally as the material moves rearwardly along the floor.

12. The invention defined in claim 11 wherein the crop directing means includes means mounting the vanes for shifting between alternate positions to selectively vary the angle of inclination of the vanes.

* * * * *